(12) United States Patent
Motchenbacher et al.

(10) Patent No.: US 7,585,486 B2
(45) Date of Patent: *Sep. 8, 2009

(54) PRODUCTION OF HIGH-PURITY NIOBIUM MONOXIDE AND CAPACITOR PRODUCTION THEREFROM

(75) Inventors: Charles A. Motchenbacher, Robesonia, PA (US); James W. Robison, Lititz, PA (US); Brian J. Higgins, Reading, PA (US); Thomas J. Fonville, Reading, PA (US)

(73) Assignee: Reading Alloys, Inc., Robesonia, PA (US)

( * ) Notice: Subject to any disclaimer, the term of this patent is extended or adjusted under 35 U.S.C. 154(b) by 114 days.

This patent is subject to a terminal disclaimer.

(21) Appl. No.: 11/753,342

(22) Filed: May 24, 2007

(65) Prior Publication Data

US 2008/0226488 A1    Sep. 18, 2008

Related U.S. Application Data

(60) Division of application No. 10/834,427, filed on Apr. 29, 2004, now abandoned, which is a continuation-in-part of application No. 10/428,430, filed on May 2, 2003, now Pat. No. 7,157,073.

(51) Int. Cl.
*C01G 33/00* (2006.01)

(52) U.S. Cl. .................. 423/594.17; 423/62; 241/3; 241/22; 241/23; 264/5; 264/118; 264/402; 264/403; 264/404; 264/681

(58) Field of Classification Search ............ 423/594.17, 423/62; 241/3, 22, 23; 264/5, 118, 402, 264/403, 404, 681
See application file for complete search history.

(56) References Cited

U.S. PATENT DOCUMENTS

| | | | |
|---|---|---|---|
| 3,635,693 | A | 1/1972 | Friedrich et al. |
| 5,242,481 | A | 9/1993 | Kumar |
| 5,993,513 | A | 11/1999 | Fife |
| 6,391,275 | B1 | 5/2002 | Fife |
| 6,416,730 | B1 | 7/2002 | Fife |
| 6,576,099 | B2 * | 6/2003 | Kimmel et al. ............ 204/291 |
| 6,639,787 | B2 | 10/2003 | Kimmel et al. |
| 7,157,073 | B2 * | 1/2007 | Motchenbacher et al. ............ 423/594.17 |
| 2003/0104923 | A1 | 6/2003 | Omori et al. |

FOREIGN PATENT DOCUMENTS

| | | |
|---|---|---|
| EP | 1 075 884 | 2/2001 |
| JP | 2002-524378 | 8/2002 |
| WO | WO 98/35920 | 8/1998 |
| WO | WO 98/45210 | 10/1998 |
| WO | WO 98/49356 | 11/1998 |
| WO | WO 99/57739 | 11/1999 |
| WO | WO 99/64638 | 12/1999 |
| WO | WO 00/15555 | 3/2000 |
| WO | WO 00/15556 | 3/2000 |
| WO | WO 00/56486 | 9/2000 |
| WO | WO 00/57993 | 10/2000 |
| WO | WO 00/69588 | 11/2000 |
| WO | WO 01/59166 | 8/2001 |
| WO | WO 01/64374 | 9/2001 |
| WO | WO 01/71738 | 9/2001 |
| WO | WO 02/086923 | 10/2002 |

OTHER PUBLICATIONS

Yan, et al., "Production of Niobium Powder by Direct Electrochemical Reduction of Solid $Nb_2O_5$ in a Eutectic $CaCl_2$-NaCl Melt", *Metallurgical and Materials Transactions B*, vol. 33B, Oct. 2002, pp. 685-693.

Yan, et al., "Using Electro-Deoxidation to Synthesize Niobium Sponge from Solid $Nb_2O_5$ in Alkali-Alkaline-Earth Metal Chloride Melts", *J. Mater. Res.*, vol. 18, No. 2, Feb. 2003, pp. 346-356.

* cited by examiner

*Primary Examiner*—Steven Bos
(74) *Attorney, Agent, or Firm*—Duane Morris LLP

(57) ABSTRACT

The present invention relates to high-purity niobium monoxide powder (NbO) produced by a process of combining a mixture of higher niobium oxides and niobium metal powder or granules; heating and reacting the compacted mixture under controlled atmosphere to achieve temperature greater than about 1945° C., at which temperature the NbO is liquid; solidifying the liquid NbO to form a body of material; and fragmenting the body to form NbO particles suitable for application as capacitor anodes. The NbO product is unusually pure in composition and crystallography, and can be used for capacitors and for other electronic applications. The method of production of the NbO is robust, does not require high-purity feedstock, and can reclaim value from waste streams associated with the processing of NbO electronic components. The method of production also can be used to make high-purity $NbO_2$ and mixtures of niobium metal/niobium monoxide and niobium monoxide/niobium dioxide. The method further is ideal for doping of the product oxides to enhance particular characteristics of the materials. The method further allows the production of single crystal or directionally-solidified ingots. In contrast to the spongy, highly porous agglomerates produced by other techniques, the present invention produces solid, non-porous ingots that can be fragmented to fine, non-porous angular particles suitable for electronic applications.

10 Claims, 3 Drawing Sheets

(a)

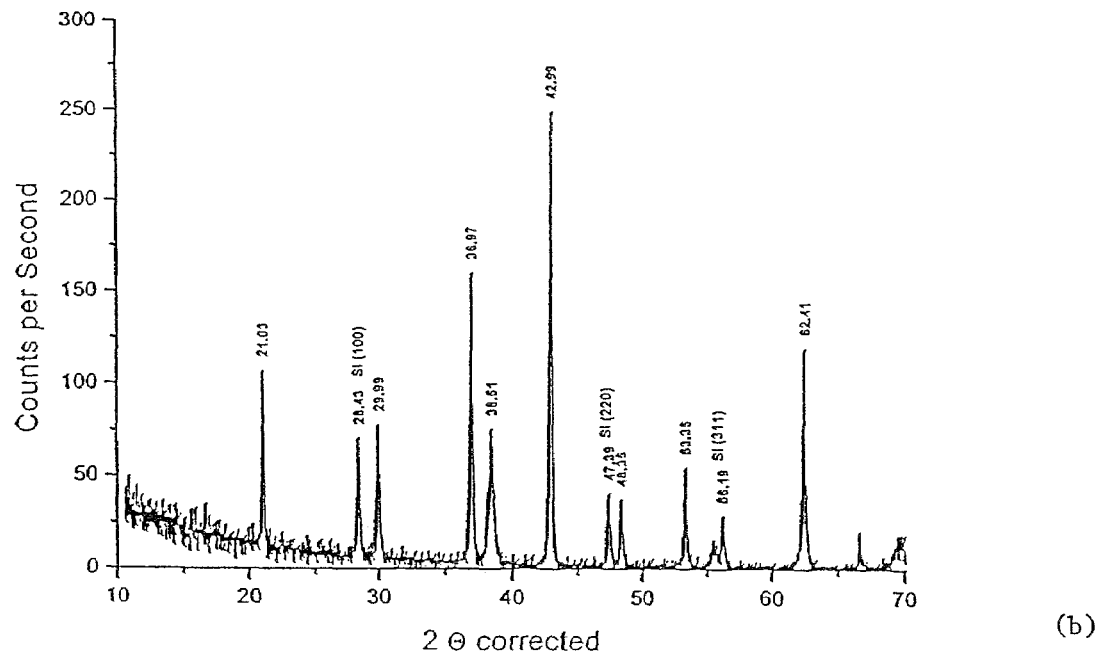
(b)
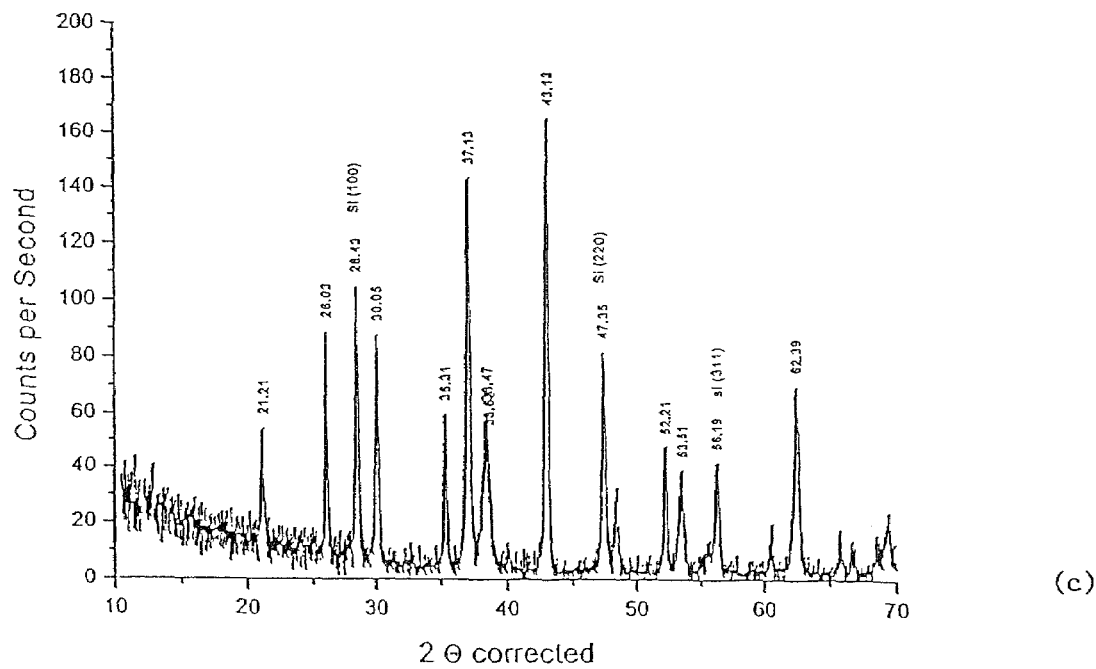
(c)

PRODUCTION OF HIGH-PURITY NIOBIUM MONOXIDE AND CAPACITOR PRODUCTION THEREFROM

CROSS REFERENCE TO RELATED APPLICATIONS

This application is a divisional of U.S. patent application Ser. No. 10/834,427, filed Apr. 29, 2004, now abandoned, which is a continuation-in-part of U.S. patent application Ser. No. 10/428,430, filed May 2, 2003, now U.S. Pat. No. 7,157,073.

FIELD OF THE INVENTION

The present invention relates to a method of producing niobium monoxide powder of high purity, and the use of such niobium monoxide powders in the production of valve devices, i.e., capacitors.

BACKGROUND OF THE INVENTION

It has been recognized that niobium monoxide (NbO) has some unusual electrical properties that make it well-suited for the manufacture of electronic capacitors. It is of much lower flammability than equivalent tantalum powders, is less costly than tantalum, and has much larger potential supply than tantalum. However, niobium monoxide capacitor powders require high levels of purity, with not only foreign elements such as iron and copper being deleterious, but other forms of niobium such as niobium metal, niobium dioxide ($NbO_2$), niobium trioxide ($Nb_2O_3$) and niobium pentoxide ($Nb_2O_5$) being harmful. In order to be useful in a valve application, the niobium monoxide must be in a finely divided form, i.e., fine powder or, preferably, agglomerates formed from small particles, such small particles typically about 1-2 microns in diameter or finer. In order to meet these requirements, the electronics industry has produced niobium monoxide by reacting agglomerated and sintered niobium pentoxide or niobium dioxide (optionally pre-reduced from the pentoxide) with a metallic reducing agent under conditions in which the niobium oxides remain in the solid state. This allows the particle morphology of the original agglomerated oxide to be preserved in the niobium monoxide. In one embodiment of this process, niobium pentoxide is reacted at temperatures of approximately 1000° C. with finely-divided metallic niobium, in such stoichiometric proportions as to produce primarily niobium monoxide. In another embodiment, the niobium pentoxide or niobium dioxide is reacted with gaseous magnesium, again at temperatures of approximately 1000° C. This results in a spongy, highly porous niobium monoxide-magnesium oxide mixture. After leaching the magnesium oxide, the resultant product is a porous, high-surface area agglomerated mass of niobium monoxide.

Because of the low processing temperatures used in these methods of producing niobium monoxide, there is virtually no opportunity to remove any impurities in either the niobium oxide or the reducing agent feedstocks. Moreover, impurities on the surface of the feedstock particles remain on the surface through the solid-state processing, resulting in potentially detrimental concentrations of these impurities on the surface of the NbO particles. The electronic characteristics of capacitors produced from such surface-contaminated particles may be seriously degraded. The purity requirements of the niobium monoxide dictate the purity required of the feedstock. The surface area requirements of the product niobium monoxide dictate the particle size distribution and morphology of the niobium pent-or-di-oxide and niobium metal needed for the process. These requirements severely limit the availability of suitable raw materials. Further, because the reactions occur in the solid state, the reactions are sluggish and often do not go to completion. The product contains some higher oxides of niobium, and often some niobium metal.

Thus, an object of the present invention is to produce niobium monoxide (NbO) powder of high purity and sufficient surface area to meet the requirements of NbO capacitors without the constraints of raw materials purity and particle size imposed by solid-state processes, and the use of such powders in the production of capacitors. The present invention also can be used to produce high-purity niobium dioxide, and to produce large, (non-particulate) non-porous objects of both niobium monoxide and niobium dioxide. The powders produced from such objects are non-porous and angular in shape.

SUMMARY OF THE INVENTION

The present invention relates to a high-purity niobium monoxide or niobium dioxide powder, produced by a process comprising:

(a) combining a mixture of niobium pentoxide, niobium trioxide, and/or niobium dioxide and coarse niobium metal powder in amounts stoichiometrically calculated to yield a product with a fixed atomic ratio of niobium to oxygen, said ratio being close to about 1:1 in the case of niobium monoxide, or about 1:2 in the case of niobium dioxide;

(b) forming a compact of said mixture by cold isostatic pressing or other techniques known to those skilled in the art;

(c) exposing said compact to a heat source sufficient to elevate the surface temperature above the melting point of the product niobium monoxide or niobium dioxide, i.e., greater than about 1945° C. for niobium monoxide or about 1915° C. for niobium dioxide in an atmosphere suitable to prevent uncontrolled oxidation;

(d) allowing the mixture to react exothermically to produce the desired niobium monoxide;

(e) solidifying the liquid mixture to form a solid body of niobium monoxide;

(f) fragmenting the body to form the desired particle size of niobium monoxide; and, (g) producing capacitor anodes from said niobium oxide particles by techniques common to the capacitor industry.

For example, in order to produce niobium monoxide from niobium pentoxide, the mixture of niobium pentoxide and metallic niobium would have about a 1:1 ratio by weight. In order to produce niobium dioxide from niobium pentoxide, the mixture of niobium pentoxide and metallic niobium would have about a 5.7:1 ratio by weight.

DESCRIPTION OF THE PREFERRED EMBODIMENTS

Figure 1:
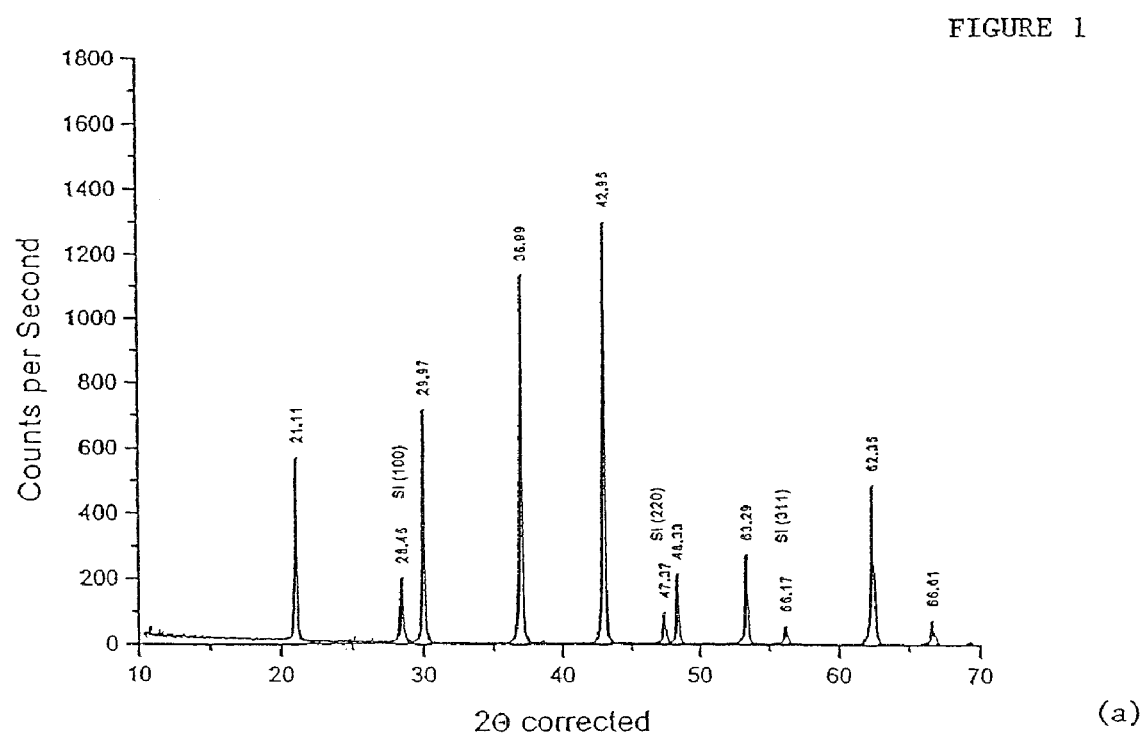
FIGS. 1 a-c display the x-ray diffraction patterns for NbO produced by the present invention (FIGS. 1 a-b) and NbO produced by a commercial, solid-state reaction (FIG. 1c)

The present invention relates to a method of producing niobium monoxide powder which includes combining a mixture of $Nb_2O_5$, $Nb_2O_3$, and/or $NbO_2$, and niobium metal; forming a compacted bar of the mixture; reacting the mixture at a temperature greater than about 1945° C.; solidifying the reaction products; and fragmenting the solidified body to form niobium monoxide powder. In a preferred embodiment of the present invention, the weight ratio of niobium pentoxide to niobium metal is about 1:1. Niobium dioxide powder can be made in the same process by adjusting the ratio of niobium pentoxide to niobium metal to about 5.7:1.

The present invention also relates to the production of a high-purity niobium monoxide or niobium dioxide powder produced by this process from impure niobium pentoxide and/or impure niobium dioxide, and from impure niobium metal powder. In the present invention, the high processing temperature, controlled atmosphere and the presence of a liquid state can be exploited to remove some major impurities, including iron, aluminum, and most other elements other than refractory metals. Impurities on the surface of the feedstocks (from crushing, grinding, milling, etc.) are dissolved into the liquid NbO, producing a uniform distribution throughout the particle and thereby reducing the harmful effects of such impurities. The liquid state processing also allows other, desirable elements to be added to the product.

The solid ingot produced by the present invention can be sized to any desired size by comminution techniques well known to those skilled in the art. This allows production of sizes from the ingot down to sub-micron particles. Moreover, coarse particles of niobium monoxide or niobium dioxide can be used as milling media to produce fine powders free of the contamination introduced by ordinary milling media.

EXAMPLE 1

In the testing of the present invention, a mixture of commercially-available 99.99% pure $Nb_2O_5$ and commercially-available electron-beam triple-refined dehydrided niobium metal powder (50×80 US mesh) was blended and formed into a bar by cold isostatic pressing, although other means of compaction and resultant physical forms are acceptable. Three such bars were prepared.

The compacts of $Nb_2O_5$ and niobium metal (weight ratio 1:1.05) were each fed sequentially into the melting region of an electron beam vacuum furnace, where each compact reacted and liquefied when heated by the electron beam, with the liquid product dripping into a cylindrical water-cooled copper mold. When the electron beam initially struck the compact melting immediately took place, with only a small increase in chamber pressure. With experience, the production rate easily reached 100 pounds an hour. Reaction was terminated before the final compact had been fully consumed, leaving a layer of partially-reacted materials on the face of the residual compact.

While an electron-beam furnace was used in this experiment, it is obvious to those skilled in the metallurgical arts that other energy sources capable of heating the materials to at least 1945° C. could also be used, including, but not limited to, cold crucible vacuum induction melting, plasma inert gas melting, vacuum arc remelting, and electrical impulse resistance heating.

The method of the present invention provides an opportunity to add a wide range of dopant materials to the mixtures prior to compaction, such additions melting into the liquid melt during the melt-reaction process. Such dopants include, but are not limited to tantalum, titanium, vanadium, and aluminum. Such dopants may be added in amounts up to 40% by weight. While the usual purpose of dopants is to improve the specific capacitance of capacitor materials, they may provide other advantages, such as improved long-term stability and reduced DC leakage.

A further advantage of the present invention relates to the form of the ingot so produced. By applying well-known metallurgical principles, it is possible to produce a single-crystal or directionally-solidified ingot that may offer advantages in applications beyond conventional capacitor powders.

The resultant ingot was allowed to cool under vacuum, and the apparatus was vented to atmosphere. The ingot was a solid, non-porous cylinder. The ingot was subsequently shattered by impact. Samples were taken from the top one inch of the ingot (the "top" samples), while "edge" samples were taken from lower mid-radius locations in the ingot.

Subsequent analysis of the product NbO samples by x-ray diffraction showed a clean pattern for NbO, with no additional lines attributable to niobium metal, $NbO_2$ or $Nb_2O_3$. In FIG. 1, the x-ray diffraction patterns are shown for NbO produced by the present invention (FIGS. 1 a-b), and NbO produced by a commercial solid-state reaction (FIG. 1c). The solid-state reaction product has numerous lines not originating with NbO, indicating the presence of other, undesirable phases. Gravimetric analysis showed the material to be stoichiometric NbO, within the limits of analytical precision.

It will be apparent to those skilled in the art that alterations in the initial powder mixture allow the production not only of high-purity niobium monoxide, but also of high-purity niobium dioxide, and further of intimate mixtures of niobium metal/niobium monoxide or niobium monoxide/niobium dioxide, as illustrated in the Niobium—Oxygen phase diagram (see, "Binary Alloy Phase Diagrams", American Society for Metals, Metals Park, Ohio, 1990, p. 2749).

Figure 2:
FIG. 2 is an illustration of an ingot reduced to sharp, angular, substantially non-porous individual pieces.

The ingot was then taken down to powder by conventional crushing, grinding and milling techniques. Upon crushing the ingot was reduced to sharp, angular, non-porous individual pieces, as illustrated in FIG. 2. The morphology of these pieces was retained by individual particles down to sub-micron sizes. The resultant NbO powder had a Microtrac D50 of 2.38 microns and a B.E.T. surface area of 2.06 $m^2$/gram. When formed into a capacitor anode under conventional conditions, (Forming Voltage 35 V; Forming current 150 mA/g, sintered at 1400° C.) the anodes showed specific capacitance at a 2-volt bias of 60,337 CV/g and a DC Leakage of 0.31 nA/CV. Tested with a 0 volt bias, the specific capacitance was 78,258 CV/g and the DC Leakage was 0.23 nA/CV. These values are well within the normal range for commercial capacitors produced from NbO made by solid-state reactions, as well as some tantalum capacitors.

EXAMPLE 2

Four additional experimental runs were performed using less pure feedstock and altering the sizing of the feedstock used to make the compacts. In each case, the product was NbO free of other compounds and free of metallic niobium. This indicates the subject process is robust and not dependent on particular sources of oxides or niobium metal. In one experimental run, the commercial-grade niobium pentoxide used as feedstock contained approximately 400 ppm of iron, and the niobium metal contained less than 50 ppm of iron. After converting the feedstock to NbO by the subject process, the NbO was analyzed and found to contain less than 100 ppm of iron. This represents a reduction of at least 50% in the iron content during the subject process. The subject process also offers the opportunity to recover NbO values from waste streams associated with production of powder-based NbO products, since the refining action of the present invention can effectively remove or dilute most contaminants, even when such contaminants are present as fine or micro-fine powders or particles.

The NbO ingot from each of these four additional experimental runs was reduced in size by conventional crushing, grinding and milling to an average particle size under 2.5 microns, formed into test anodes, and tested for capacitance and leakage rates. The results in each case were similar to the initial results described above, including anodes produced from NbO originating from the high-iron feedstock as noted above. The specific capacitance and DC leakage of NbO powder produced from such ingots were 69,200 CV/g and 0.34 nA/CV, respectively. While the iron level would normally be considered too high to permit good DC leakage values, in these examples the iron has been uniformly re-distributed throughout the particles. This re-distribution results in a very low level of iron on the particle surfaces, so that the iron does not degrade the leakage characteristics of the NbO.

EXAMPLE 3

The formation of niobium monoxide by melt phase processing lends itself to the recovery and remelting of niobium monoxide solids in, but not limited to powder, chips, solids, swarf and sludges. Off-grade powder, recycled capacitors and powder production waste are among the materials that can be reverted to full value niobium monoxide by this process. A compact was prepared from "waste" NbO powders of various sizes and production states. The compact was melt-reacted in the electron beam furnace to produce a sound NbO ingot. Subsequent testing of the ingot showed it to be indistinguishable in crystalline structure, purity, and electronic characteristics (specific capacitance, DC leakage) from earlier ingots produced from high-purity raw materials. Glow Discharge Mass Spectrometry showed no elevated impurity levels compared to earlier "high-purity" ingots.

EXAMPLE 4

Niobium pentoxide and metallic niobium powder were mixed in proportions calculated to produce niobium dioxide, and the mixture compacted and melt-reacted in the electron beam furnace as described above. The ingot was sound, solid, and showed no obvious defects. A sample taken from the ingot was analyzed to determine the ratio of oxygen and niobium. Within the limits of analytical precision, it was stoichiometric $NbO_2$. $NbO_2$ theoretically contains 25.13% oxygen by weight. The $NbO_2$ of this example analyzed 25.14% oxygen.

Although the invention has been described and illustrated with reference to specific illustrative embodiments thereof, it is not intended that the invention be limited to those illustrative embodiments. Those skilled in the art will recognize that variations and modifications can be made without departing from the spirit of the invention. It is therefore intended to include within the invention all such variations and modifications which fall within the scope of the appended claims and equivalents thereof.

What is claimed is:

1. A method of producing niobium monoxide (NbO) ingots or powder which comprises:
   a) combining a mixture of (1) a niobium oxide selected from the group consisting of $Nb_2O_5$, $NbO_2$, and $Nb_2O_3$, and (2) metallic niobium, wherein the niobium oxide and metallic niobium are present in powder or granular form;
   b) forming a compact of said mixture;
   c) reacting the compact of said mixture with a heat source such that a temperature greater than 1945° C. is achieved; and
   d) solidifying the reacted mixture to form a body of material, wherein the body of material is the NbO ingot; or
   e) fragmenting the body of material to form the NbO powder.

2. The method as recited in claim 1, wherein the mass ratio of $Nb_2O_5$ to niobium metal powder or granules in the mixture is about 1:1.

3. The method as recited in claim 1, wherein the mass ratio of $NbO_2$ to niobium metal powder or granules in the mixture is about 1.3:1.

4. The method as recited in claim 1, wherein the mass ratio of $Nb_2O_3$ to niobium metal or granules in the mixture is about 2.5:1.

5. The method as recited in claim 1, wherein the niobium oxide is $Nb_2O_5$.

6. The method as recited in claim 1, wherein the heat source is an electron beam furnace.

7. The method as recited in claim 1, wherein the heat source is a plasma-arc furnace.

8. The method as recited in claim 1, wherein the heat source is an induction furnace.

9. The method as recited in claim 1, wherein the heat source is a vacuum arc remelting furnace.

10. The method as recited in claim 1, wherein the mixture further comprises niobium monoxide revert, niobium metal lead wire, or other niobium-containing waste products.

* * * * *